United States Patent
Baron et al.

(10) Patent No.: US 8,238,238 B2
(45) Date of Patent: Aug. 7, 2012

(54) PERFORMING NETWORKING TASKS BASED ON DESTINATION NETWORKS

(75) Inventors: Andrew T. Baron, Redmond, WA (US); Aaron W. Cunningham, Bellevue, WA (US); David Jones, Seattle, WA (US); Arun K. Buduri, Seattle, WA (US); Deon C. Brewis, Redmond, WA (US); Bill Begorre, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 12/121,961

(22) Filed: May 16, 2008

(65) Prior Publication Data

US 2009/0285190 A1 Nov. 19, 2009

(51) Int. Cl.
H04Q 7/24 (2006.01)
(52) U.S. Cl. ........ 370/230; 370/252; 370/338; 370/401; 455/432.3; 709/228
(58) Field of Classification Search .................. None
See application file for complete search history.

(56) References Cited

U.S. PATENT DOCUMENTS

| | | | |
|---|---|---|---|
| 5,914,937 A * | 6/1999 | Arnold | 370/231 |
| 6,539,483 B1 | 3/2003 | Harrison et al. | |
| 7,293,107 B1 | 11/2007 | Hanson et al. | |
| 2002/0065941 A1 | 5/2002 | Kaan et al. | |
| 2003/0069947 A1 | 4/2003 | Lipinski | |
| 2003/0214955 A1 | 11/2003 | Kim | |
| 2004/0077341 A1 | 4/2004 | Chandranmenon et al. | |
| 2005/0099962 A1 | 5/2005 | Matsuda | |
| 2006/0015636 A1 | 1/2006 | Skraba et al. | |
| 2006/0198448 A1 | 9/2006 | Aissi et al. | |
| 2007/0030826 A1 | 2/2007 | Zhang et al. | |
| 2007/0097877 A1 | 5/2007 | Hoekstra et al. | |
| 2007/0223432 A1 | 9/2007 | Badarinath | |
| 2008/0040460 A1 | 2/2008 | Oruvilakott et al. | |
| 2008/0167033 A1 * | 7/2008 | Beckers | 455/432.3 |
| 2008/0320025 A1 * | 12/2008 | Ozzie et al. | 707/102 |

OTHER PUBLICATIONS

International Search Report dated May 12, 2010 from PCT/US2009/036176.
iPassConnect Universal Client http://ipass.com/services/services_mo_ipc.html; retrieved Feb. 4, 2008.
Mobility Client Roams to Interfaces that Cannot Reach Connection Manager http://www-1.ibm.com/support/docview.wss?rs=804&context=SSZQDW&dc=DB520&uid=swg21245102&loc=en_US&cs=UTF-8&lang=en&rss=ct804websphere; retrieved Feb. 4, 2008.
QuickLink Mobility Client http://www.smithmicro.com/default.tpl?group=subsolutions&id1=75&id2=110&page=client; retrieved Feb. 4, 2008.

* cited by examiner

*Primary Examiner* — Chi H. Pham
*Assistant Examiner* — Shick Hom

(57) ABSTRACT

Methods and systems which identify and interact with network interfaces based on the network to which they provide access. A computing device operating in accordance with one or more of the principles described herein may examine available network interfaces and identify the network to which the network interfaces provide access, and perform networking tasks on interfaces based on the network identified. For example, a user may instruct a computing device to connect to a specified network, and the computing device will select a particular network interface by which to connect from the one or more available network interfaces that are able to connect to that network. Alternatively, a user may manage policies (e.g., security, connection, and application policies) based on the network to which a network interface provides access and thereby manage a network regardless of which of multiple network interfaces is used to access the network.

20 Claims, 9 Drawing Sheets

PERFORMING NETWORKING TASKS BASED ON DESTINATION NETWORKS

BACKGROUND

Computer networks are growing in popularity. Today, a computer user may be expected to connect to a computer network not only at his or her workplace, but also in the home and in commercial establishments (e.g., coffee shops, malls, etc.), as well as while moving about via cellular technologies such as linked wireless hotspots and wide-area network (WAN) technologies.

Additionally, as computer networks have grown in popularity, the means by which computers and users can connect to these networks have grown in number. Where only a few years ago many networks only offered users the ability to connect via a direct, local, wired network interface (e.g., an Ethernet network interface directly to an enterprise network, such as a network interface within an office building), networks are offering an increasing number of network interface types to users. For example, some networks (e.g., enterprise networks) may offer, in addition to or as an alternative to wired network interfaces, wireless network interfaces operating according to one or more protocols (e.g., one or more of the Institute for Electrical and Electronics Engineers' (IEEE) 802.11 protocols), remote network interfaces via protocols such as those which establish Virtual Private Networks (VPNs), and/or other types of network interfaces. Home networks, too, are experiencing a growing number of network interface options. Increasingly, home networks offer wired network interfaces and/or wireless network interfaces using one or more networking technologies such as IEEE 802.11a, 802.11b, 802.11g, and/or 802.11n.

Accordingly, a contemporary computer may support a wide array of networking technologies which may be used to connect to computer networks, and a computer network may offer multiple types of network interfaces to computers seeking to connect.

SUMMARY

Conventional networking techniques identify individual network interfaces by their type (e.g., wired, wireless, dial-up, VPN, ad-hoc, etc.) and perform networking tasks on each of these network interfaces individually. For example, connection parameters and security parameters may be set for each individual network interface. Establishing a connection to a network may therefore be complicated and time-consuming for some users who may not have full understanding of the types of network interfaces available to them.

In accordance with principles described herein, techniques may be implemented which instead identify and interact with network interfaces based on the network to which they provide access. A computing device operating in accordance with one or more of the principles described herein may examine available network interfaces and identify the network to which the network interfaces provide access. By identifying networks associated with network interfaces, networking tasks may be performed on network interfaces based on the network identified. For example, a user may instruct a computing device to connect to a specified network, and the computing device will select a particular network interface by which to connect from the one or more available network interfaces which are able to connect to that network, or a user may manage policies (e.g., security policies) based on the network to which a network interface provides access and thereby manage a network regardless of which of multiple network interfaces is used to access the network. Accordingly, a user need not be familiar with the individual types of network interfaces available to the user, but instead may manage connectivity in terms of the networks available.

Managing networks in this manner may present a number of advantages, including allowing for a simplified and improved interface for users that limits confusion and eases the connectivity process. Further, establishment of policies (e.g., security and connection policies) for computers may be improved by basing connectivity on the destination network rather than individual network interfaces, which may make the process easier for users including administrators, who may define a single group of policies for multiple network interfaces (e.g., all network interfaces to a common destination network) rather than defining separate policies for each network interface. Additionally, the policies may be applied to new network interfaces, such as when a destination network offers a new type of network interface, and thus limits the amount of maintenance needed. These policies may include connection policies which may automate connection of a computing device to a network, such as by defining that the computing device should establish a connection through any available and suitable network interface to a particular destination network when that destination network is available. Further, a common networking Application Programming Interface (API) that networking applications may use to manage connectivity may be offered in some implementations, which may manage many different types of network interfaces through interacting with a process based on destination network rather than individual network interfaces. Such an API may be easier to use and may make networking applications (including applications which initiate connections in addition to performing other tasks) easier to create as they only need support a single API and not one for each type of possible network interface.

In one embodiment, there is provided a method. The method comprises, for each of a plurality of network interfaces, identifying a destination network to which a network interface provides access. Of the plurality of network interfaces, at least two of the plurality of network interfaces provide access to a same destination network. The method further comprises, for each identified destination network, aggregating one or more common network interfaces that provide access to the identified destination network to determine a set of available destination networks, and performing at least one network management task based on a common destination network of the set of available destination networks.

In another embodiment, there is provided at least one computer storage medium encoded with computer-executable instructions that, when executed, implement a method. The method comprises gathering information on destination networks to which a plurality of network interfaces provide access, identifying which of the plurality of network interfaces provide access to a same destination network to determine a first set of one or more available destination networks, and providing to a consumer of network information the first set of one or more available destination networks. The method further comprises accepting input from the consumer of network information an indication of a desired destination network to which to connect, selecting, from a second set of one or more network interfaces providing access to the desired destination network and without input from the consumer of network information, a particular network interface by which to connect, and connecting to the desired destination network via the particular network interface.

In a further embodiment, there is provided a method of managing network interfaces providing access to destination networks to a computing device. The method comprises identifying a destination network to which the computing device has connected and/or is able to connect, accepting one or more inputs from a consumer of network information regarding policies to be applied when the destination network is available, storing indications of the one or more inputs in a data store associated with the destination network, and regulating network connectivity according to the one or more inputs when the destination network is available.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
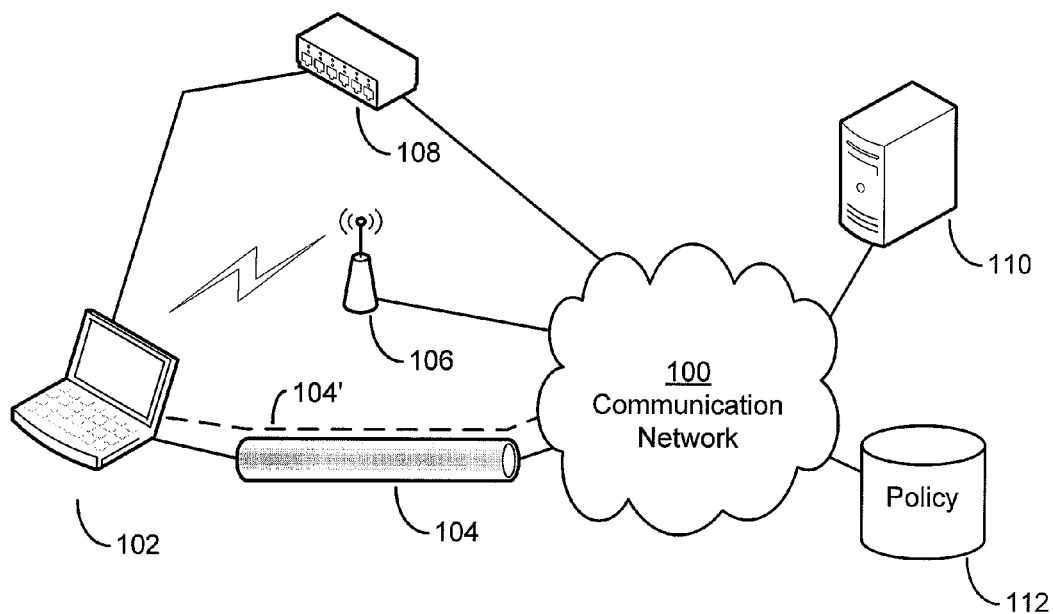
FIG. 1A and FIG. 1B are exemplary computer systems in which techniques operating according to one or more of the principles described herein may operate.

While the increasing number of connectivity options available to users may provide some advantages in that users may be able to connect to networks from more locations, users may have to become familiar with an increasing number of communication technologies to feel these advantages. Where before, when connecting to the network, a user only needed to be familiar with, for example, connecting using the wired network interface, users now may be required to choose, in the case of a wireless network, a particular wireless protocol over which to connect (e.g., IEEE 802.11b or IEEE 802.11g) and further choose a particular wireless network to which to connect from a plurality of available wireless networks. Further, as network security risks become more common, a user may be required to manage security options for each of the network interfaces, such as enabling or disabling firewalls or adding firewall rules for the network interfaces individually. In some cases, a user may even need to specify a particular server against which to authenticate or other properties. Users in some such situations may be required not only to be familiar with the security techniques being managed, but also to be familiar with the networking protocols on which the security techniques are being used such that the user may sufficiently protect the connection without disabling it through enforcing too much security.

Given this possibly confusing range of options and increasing necessity of knowledge, some users may be deterred from using all available networking technologies by these challenges and may not take full advantage of the options available to them.

Applicants have recognized and appreciated that a user experience may be improved by presenting and managing network interfaces in a different manner, to allow consumers of network information, such as users, to take more full advantage of the networks. Many users identify connectivity with the destination network to which they are connecting (e.g., a home network, an enterprise network for a company/organization, a wireless network of a neighborhood coffee shop, etc.) and not by the individual network interface type. Permitting users to manage network connectivity in terms of the destination infrastructure (i.e., the destination network) to which network interfaces offer access may therefore be more intuitive for users. Accordingly, in some exemplary implementations of the principles described herein, network interfaces may be identified by and networking policy (e.g., connection policies, security policies, and other policies) may be managed according to the destination network of a network interface.

A network interface may be any suitable point of access for a destination network by which a computing device may send information to and/or receive information from other computing devices connected to the network. A connection may be managed and established to a destination network over a network interface using a network adapter of the computing device. A network adapter may be configured to maintain one or more connections over one or more network interfaces at a time. As described above, a single destination network may make multiple network interfaces available to a computing device, such as one or more wired network interfaces and one or more wireless network interfaces.

A destination network, accessible by a network interface, may be any suitable grouping of networked computing devices at any suitable level of a networking hierarchy. For example, a destination network may be a subnet of a larger network, such as a portion of an enterprise network, or a destination network may be the entire enterprise network. As another example, a destination network may be a home network of a user, or may be the network of the Internet Service Provider (ISP) to which the user subscribes.

A destination network associated with a network interface may be determined in any suitable way. For example, in some implementations, a user may be prompted to define the destination network upon connection, may set one or more policies regarding destination network definitions (e.g., a default size/scope of destination network, such as defining that, by default, a destination network will be a subnet rather than the entire enterprise network), or an identification module may be adapted to define a destination network based on one or more properties of the destination network retrieved following connection (e.g., if the destination network includes a domain controller, the identification module may retrieve from the domain controller a definition of the network).

The techniques described herein may be implemented in of various computing systems, examples of which are described in greater detail below. Such systems generally involve the use of suitably-configured computing devices implementing a number of modules, each providing one or more operations needed to complete execution of such techniques. Each module may be implemented in its own way; all need not be implemented the same way. As used herein, a module is a structural component of a system which performs an operational role, however instantiated, which may be a portion of or an entire software element (e.g., a function of a process, a discrete process, or any other suitable embodiment). A module may comprise computer-executable instructions, and may be encoded on a computer storage medium. Modules may be executed in parallel or serially, as appropriate, and may pass information between one another using a shared memory on the computer on which they are executing, using a message passing protocol or in any other suitable way. Exemplary modules are described below carrying out one or more tasks, though it should be appreciated that the modules and division of tasks described is merely illustrative of the type of modules that may implement the exemplary techniques described herein, and that the invention is not limited to being implement in any specific number, division, or type of modules. In some implementations, all functionality may be implemented in a single module. Further, the modules are discussed below, for clarity, as all executing on a single computing device, though it should be appreciated that, in some implementations, the modules may be implemented on separate computing devices adapted to communicate with one another. For example, one computing device may be adapted to execute an identification module to identify available networks, and connection modules on other computing devices may retrieve information on available networks from the computing device prior to establishing a connection.

In one exemplary implementation of the principles described herein, an identification module executing on a computing device may determine a set of available network interfaces. A network interface may be any suitable access point for connecting the computing device to a destination network, such as a wired (e.g., Ethernet or dial-up) or wireless (e.g., infrastructure and/or ad-hoc wireless local area networks (WLANs), wireless wide area networks (WWANs), wireless personal area networks (WPANs), or other suitable types) network interface, and may include network interfaces using remote access technologies (e.g., Remote Access Service (RAS), Virtual Private Networking (VPN) using Secure Sockets Layer (SSL), Layer 2 Tunneling (L2T), or any other suitable protocol). The identification module may then identify, for some or all of the available network interfaces, the destination network to which the network interface provides access. The identification module may then aggregate the network interfaces which provide access to a common destination network (i.e., group together the network interfaces which provide access to the same destination network) and assign a common identifier for the network interfaces. Any suitable tasks may then be performed by a user or a process executing on the computing device using the commonly-identified networks in addition to or as an alternative to performing networking tasks on the individual network interfaces. For example, a suitable user interface may display to a user the available network interfaces grouped based on the destination networks to which they offer access rather than as individual network interfaces, or a connection may be established by a connection module based on a selected destination network rather than by an individual network interface. As other examples of networking tasks that may be performed, a connection policy may be established by a policy module based on the destination networks, or a security policy may be established by a policy module for each network interface based on the network to which it provides access. Any other suitable networking task may be performed.

Techniques operating according to one or more of the principles described herein may offer several distinct advantages by managing network connectivity in this manner. For example, a connection process may, through some such techniques, be simplified for users in that users need only select a destination network and not select a particular network interface by which to connect to the network, as a connection module may be implemented to select a particular network interface based on the user input regarding the desired network. As another example, management of network connectivity may be improved by offering users (including administrators) a way by which to manage a group of network interfaces at once, as connection policies and/or security policies may be implemented and managed by a policy module according to the destination networks to which they provide access. These advantages may also extend to consumers of network information other than users, such as processes executing on a computing device seeking to manage a network interface (e.g., a process seeking to connect to a network to exchange information with another computing device connected to the network). For example, a process may be able to specify—through any suitable technique, including an Application Programming Interface (API)—a network to which the computing device should connect, rather than attempting to determine a network interface which will provide the access necessary for the process (i.e., rather than querying to determine which network interface provides access to the desired network).

Some implementations may offer another advantage through the API functions implemented in accordance with the principles described herein, as a single suite of API functions may be made implemented that uses the destination network to manage connectivity, and not the individual network interfaces, which may make writing networking program applications simpler and more efficient.

An additional advantage is offered in that by managing connectivity in terms of destination networks, redundant connections may be avoided, such as in the case where a computing device would connect to a network via a wired network interface and to the same network via a wireless network interface. In accordance with the techniques described herein, the destination network of both network interfaces could be identified and only a single connection established. Doing so saves on power consumption for a computing device, lowers a risk of security breach for the computing device because there are fewer connections open, and limits the consumption of network resources (e.g., Internet Protocol (IP) addresses) in the destination network. Further, managing network connectivity in terms of the destination network may improve the process of switching from one network interface to another within the same network, such as when a user unplugs a wired network interface and intends to switch to a wireless network interface, because the destination network of the wired network interface can be detected as the destination network of the wireless network interface, and a connection using the wireless network interface may be automatically established according to a connection policy. In this manner, a connection to a destination network may be more easily maintained, and a user may experience no disruption, or a lesser disruption, in service.

As an example of the application of the principles described herein, if an enterprise network (e.g., the enterprise network of the Microsoft Corporation of Redmond, Wash.) made available three separate network interfaces for connecting to the network (e.g., Ethernet, Wireless Local Area Network (WLAN), and VPN), a computing device may identify each of the network interfaces as associated with the same network (the Microsoft network) and, instead of displaying to a user the three available network interfaces independently, treat them as a common network interface. For example, in a networking user interface, the three network interfaces may be shown as a single network interface to the network with an identifier for the network (e.g., "Connect to Microsoft"). A user may then select the common identifier for the network, and a connection module may select, based on any suitable weighting factors, the "best" network interface by which to connect to the network. Other networking tasks may also be performed based on the network rather than the network interface. For example, security policies and other network settings may be established or modified by a security module jointly for the network interfaces, rather than for each individual network interface.

Described below are exemplary techniques for managing networks and performing networking tasks based on information about a network to which one or more network interfaces provide access. While networking tasks such as connection and security may be used in the examples provided, it should be appreciated that these tasks are merely illustrative and that any suitable networking task may be performed on network interface(s) using information about the network to which the network interface(s) provide access.

Figure 1B:
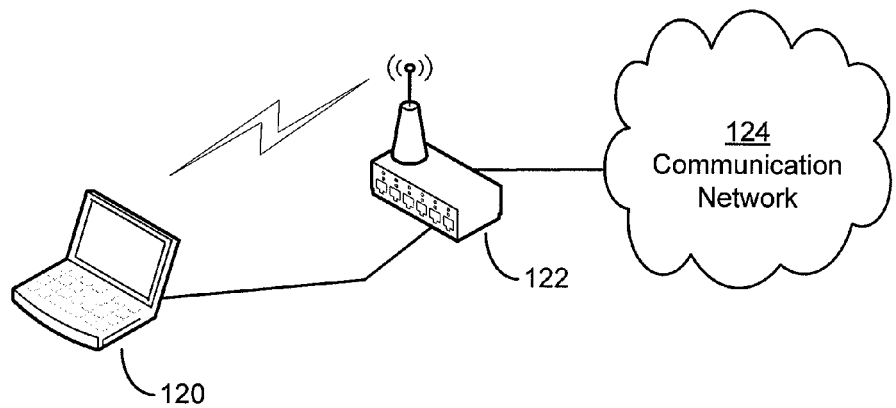

Techniques operating in accordance with the principles described herein can be implemented in any suitable computer system comprising any suitable number and type(s) of computing devices, including any suitable number and type of networking devices. FIGS. 1A and 1B show two illustrative computer systems in which some exemplary implementations of the principles described herein may act, but other implementations may operate in any other suitable computer system.

FIG. 1A shows a computer system comprising a communication network 100 to which a computing device 102 may connect. Communication network 100 may be any suitable wired and/or wireless network, including a portion of a larger wired and/or wireless network, such as a home network, a subnet of an enterprise network, the Internet, or others. Computing device 102 is shown as a laptop personal computer, but may be any suitable computing device such as a desktop personal computer, a PDA, a smart phone, a server, a rack-mounted computer, a networking device such as a router or switch, or other computing device.

The computing device 102, as shown in FIG. 1A, may connect to the communication network 100 in three ways: a wired interface (e.g., an Ethernet interface) via device 108, a wireless interface (e.g., a WLAN or WWAN interface) via device 106, or via a VPN (e.g., SSL or Layer 2 Tunneling VPN) interface 104. As described above, an identification module executing on the computing device 102 may examine the individual network interfaces via device 108, device 106, and VPN interface 104 and determine that each offers a connection to the same destination network, communication network 100. The identification module may then identify each of the network interfaces by its destination network and aggregate the network interfaces into a single unit as a connection to communication network 100.

The identification module may operate to identify a destination network of a network interface in any suitable manner, examples of which will be discussed in greater detail below. In the example of FIG. 1A, an identification module operating on computer device 102 may identify communication network 100 by communicating with networking device 110 to determine one or more properties of communication device 100. For example, networking device 110 may be a gateway for the communication network 100, connecting the communication network 100 to another network, and the identification module may identify the network based on the Media Access Control (MAC) address of the gateway. As another example, the networking device 110 may be a domain controller implementing network management functionality of one or more network management protocols, such as in a Microsoft Windows network available from the Microsoft Corporation of Redmond, Wash. In such an implementation, the identification module may be adapted to retrieve from the networking device 110 an identifier for the network, such as a Domain Group Unique Identifier (GUID) or Forest GUID. This information may be broadcast by a network, such as in a broadcast control message from a wireless device 106, or may be retrieved from the network by the identification module in any way, such as by forming a temporary connection to the network to retrieve the information. Exemplary techniques for network identification are discussed in greater detail below.

The communication network 100 may also be associated with a data store 112 (which may be, in some embodiments, implemented as a data store on network device 110 or on any other networking device connected to the network). The information stored on data store 112 may be any type or types of information about a network, including information on policies that should be applied to computing devices which connect to the network. The policies stored on data store 112 may be any suitable policies including, for example, group policies created by an administrator of a managed domain which may be sent to or retrieved by computing devices connecting to the network and may regulate communications to and/or from the communication network 100 in any suitable manner. Such policies may be security policies (comprising, for example, firewall rules which should be enforced when connecting or authentication techniques that should be used), connection policies (comprising, for example, connection rules stipulating that the computing device should prioritize a network interface via device 108 over device 106, and thereby connect using a wired network interface rather than wireless when it can), or any other suitable policy that may be retrieved by a computing device 102 before or after connection to the communication network 100 by any available network interface.

It should be appreciated that, for clarity, computing device 102 is shown in FIG. 1A only having network interfaces to communication network 100, but in some instances a computing device may have available to it network interfaces to multiple networks. For example, the VPN interface 104, though represented as a direct interface to communication network 100, may in actuality be a network interface 104' to one or more other networks (e.g., a commercial wireless network such as in a coffee shop and/or the Internet) over which a VPN connection may be established. In some such cases, the identification module may recognize a network interface to the other network as a network interface to two different destination networks: first, the one or more other networks, and second, the communication network 100 to which the computing device may connect via VPN interface 104. This may be done because to establish the VPN interface 104 the computing device 102 would have to first establish a connection to the other network, and then create a virtual connection over the connection (using, for example, tunneling protocols). The VPN interface 104 thus may represent a potential connection to two different destination networks.

FIG. 1B shows an alternative computer system in which some techniques operating according to one or more of the principles described herein may operate. In the computer system of FIG. 1B, a computing device 120 may connect to a communication network 124 through one of multiple network interfaces: via a wireless interface through device 122, or via a wired interface through device 122. As above (in FIG. 1A) computing device 120 may be any suitable computing device, and communication network 124 may be any suitable wired and/or wireless computer network. For example, communication network 124 may be a network of an Internet Service Provider (ISP) to which a user of computing device 120 subscribes, or may be a local area network such as a home or office network, or may be any other suitable type of network.

As above, an identification module may be implemented on computing device 120 to determine the destination networks of each of the network interfaces available to computing device 120—in FIG. 1B, the wireless and wired network interfaces to device 122 that provide access to communication network 124. The identification module may determine properties of communication network 124 in any suitable manner. For example, the identification module may identify the network based on properties of the network retrieved from device 122, such as a MAC address for a gateway of the communication network 124—which may be, in some implementations, the MAC address of device 122—a Service Set Identifier (SSID) of the wireless network established by device 122, properties retrieved from other networking devices connected to the communication network 124, or any other properties or characteristics of the communication network 124.

Figure 2:
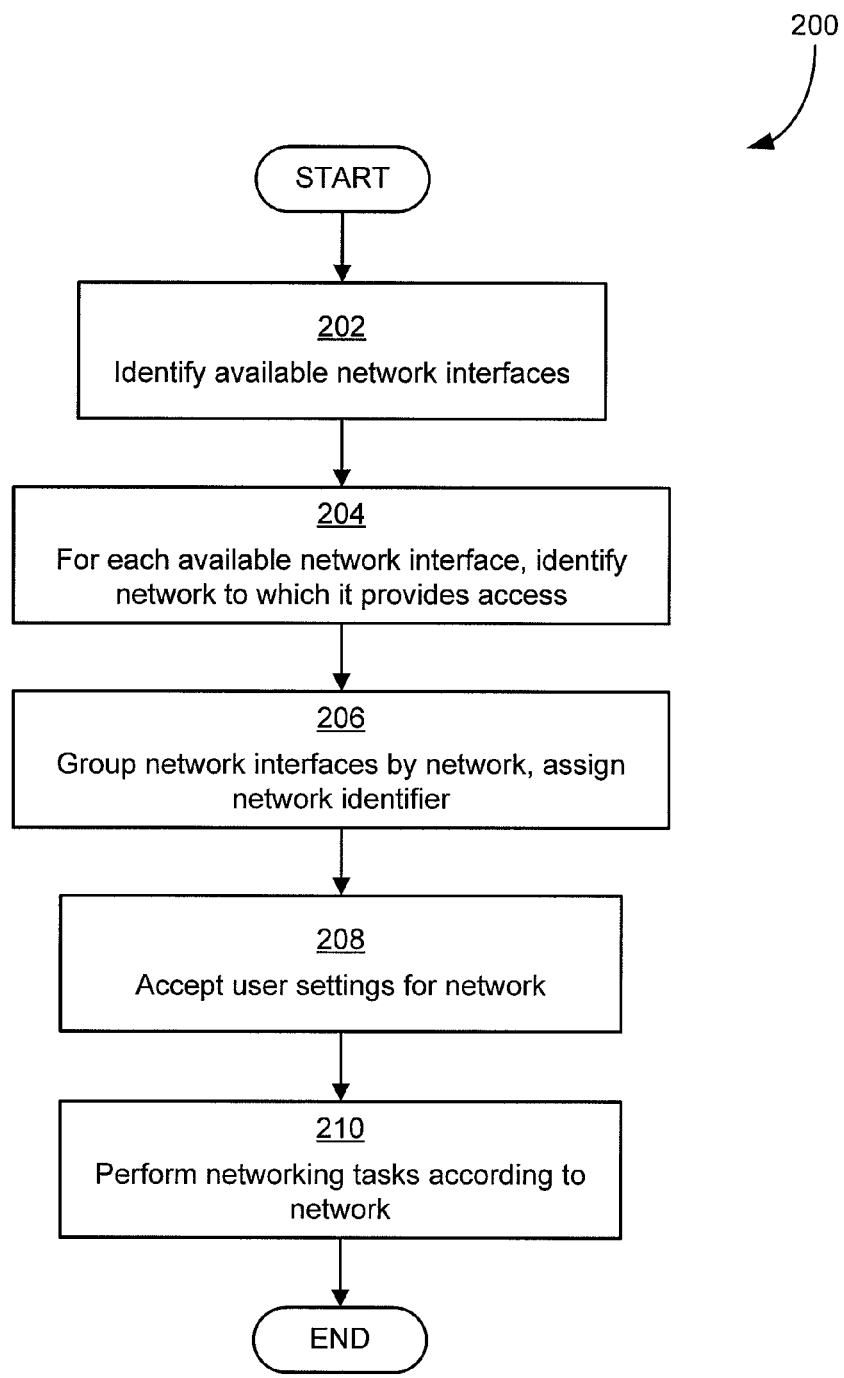
FIG. 2 is a flowchart of an exemplary process by which networking tasks may be performed in accordance with one illustrative technique operating according to some of the principles described herein.

Computing device 102 and 120 may be adapted to function in any suitable manner, and may implement any suitable module(s) to carry out tasks such as network management tasks. FIG. 2 shows an illustrative process 200 which may be implemented by a computing device in accordance with one or more of the principles described herein, though it should be appreciated that other processes may be implemented.

The illustrative process 200 begins in block 202, wherein an identification module may identify some or all available network interfaces for a computing device. As discussed above, network interfaces may be, for example, a wired interface (e.g., Ethernet, dial-up, etc.), a wireless interface (e.g., WLAN or WWAN), a remote access interface (e.g., VPN), and/or any other suitable type of network interface. In some implementations, an identification module may examine hardware of a computing device to determine available network interfaces. For example, if a computing device includes networking hardware for Ethernet and dial-up, the identification module may determine that Ethernet and dial-up network interfaces are available. Additionally or alternatively, an identification module may attempt to determine whether one or more connections may be established using the hardware before the identification module determines whether the network interface is available. For example, an identification module may examine control messages from wireless networks within range of a computing device to determine the network interfaces available. For example, for WLAN network interfaces, the identification module may review beacons received from nearby wireless access points and/or probe responses received from wireless access points in response to requests for information, and identify each available WLAN as an available network interface. The identification module may also examine properties of software executing (or able to be executed) on the computing device to determine available network interfaces. For example, if a computing device is adapted to execute VPN software, then an identification module may determine that a VPN network interface is available if any network interface over which a VPN connection may be established (e.g., a WLAN interface) is available.

In block 204, the identification module identifies, for each available network interface, the destination network to which the network interface provides access. This may be done in any suitable manner. For example, in some implementations, an identification module may first determine whether any properties of the network interface match properties of previously-used networks. In the case of a non-managed network (e.g., an interface to a home WLAN), the identification module may determine if the detected SSID of the network interface matches a previously-used network, if the gateway of the destination network matches a previously-used network, and/or if the security settings of the destination network match the security settings of a previously-used network. For a managed network (e.g., a network interface for an enterprise network), the identification module may determine whether a domain GUID of a detected network and/or security settings of a detected network match a previously-used network. If these detected properties match, then the destination network may be determined to be the previously-identified network. Such a process may be executed in any suitable manner, including by any of the techniques described in U.S. patent application Ser. No. 12/070,500, "History-based downgraded network identification," which is incorporated herein by reference in its entirety. The techniques described by U.S. patent application Ser. No. 12/070,500 include identifying destination networks by network properties including an SSID or domain GUID, as well as by any other suitable properties.

Additionally or alternatively, an identification module in block 204 may query a store of properties of a destination network to determine a destination network. These properties may be determined in any suitable manner, such as received from a broadcast transmission (e.g., a WLAN beacon), stored in a data store of connection hardware (e.g., identification information in a Subscriber Identity Module (SIM) card of WWAN access hardware), retrieved from a destination network through a temporary connection process (e.g., requesting a Domain GUID for the destination network from a network device connected to the destination network), or in any other suitable manner. Further, in some implementations, a user may be presented with a set of available network interfaces comprising some or all of the network interfaces determined in block 202, and prompted to identify the destination network to which the network interface provides access. As a further example, a destination network may be based on an identifier assigned to a network and which is provided by the destination network to the identification module (e.g., by a broadcast transmission such as a WLAN beacon). The identifier may be, for example, assigned by a network identification service and provided to identify uniquely the network to the identification module.

Regardless of how the identification module identifies a destination network of a network interface, in block 206 the identification module examines the destination networks of each network interface, aggregates the network interfaces which provide access to a common destination network, and assigns an identifier to the destination network. For example, in the example of FIG. 1A, the identification module may determine in block 206 that each of the wired interface via device 108, the wireless interface via device 106, and the VPN interface 104—each of which would have been detected in block 202—provide access to a common destination network (i.e., communication network 100), and assign a common network identifier (e.g., "Office Network" or other suitable ID). The process of block 206 may be performed for each network interface detected in block 202 to determine a set of one or more destination networks available for connection. In this manner, where in conventional network identification processes each of the network interfaces would have been identified and then managed independently, even when providing access to the same destination network, in accordance with some of the principles described herein the destination networks of each of the network interfaces are identified and the network interfaces which provide access to a common network are grouped together and considered to be a single interface to the destination network for performing networking tasks.

In some implementations, such as the implementation shown in FIG. 2, in block 208 a user may be prompted to define properties for a destination network after the destination networks have been identified. For example, a user may be prompted to assign identifiers for the networks to replace the identifiers assigned in block 206, or may be prompted to provide any other suitable setting.

As discussed in greater detail below in connection with FIG. 3, in some implementations an identification module may be adapted to verify, following a connection to a destination network, whether the network was correctly identified in block 204. In other implementations, however, an identification module may assume that its identification was correct or may decline to identify a network to which a network interface provides access if the identification module cannot be certain of an identification, as the invention is not limited to implementing any particular identification process.

In block 210, networking tasks are performed according to the destination networks determined in block 206. A networking task may be any suitable task involving a network, including, but not limited to, a task carried out on behalf of a consumer of network information (e.g., a user (including an administrator) or program managing or accessing a network). As one example, a connection module may perform a networking task by establishing a connection to a network based on the available destination networks. Such a connection establishment process may be performed in any suitable manner, examples of which are discussed below in connection with FIGS. 3 and 4. Networking tasks such as policy creation and management may also be performed by a policy module in block 210, such as creating and/or managing security and connection policies based on destination networks and not based on individual network interfaces, as discussed below in connection with FIG. 5. Networking tasks may be performed based on input from and actions taken by a user, or may be performed based on input received via an API or other suitable interface from a process executing on the computing device or on another computing device.

It should be appreciated that the exemplary process 200 shown in FIG. 2 is merely illustrative of the types of processes that may be implemented in accordance with some of the principles described herein, and that other processes are possible.

Figure 3:
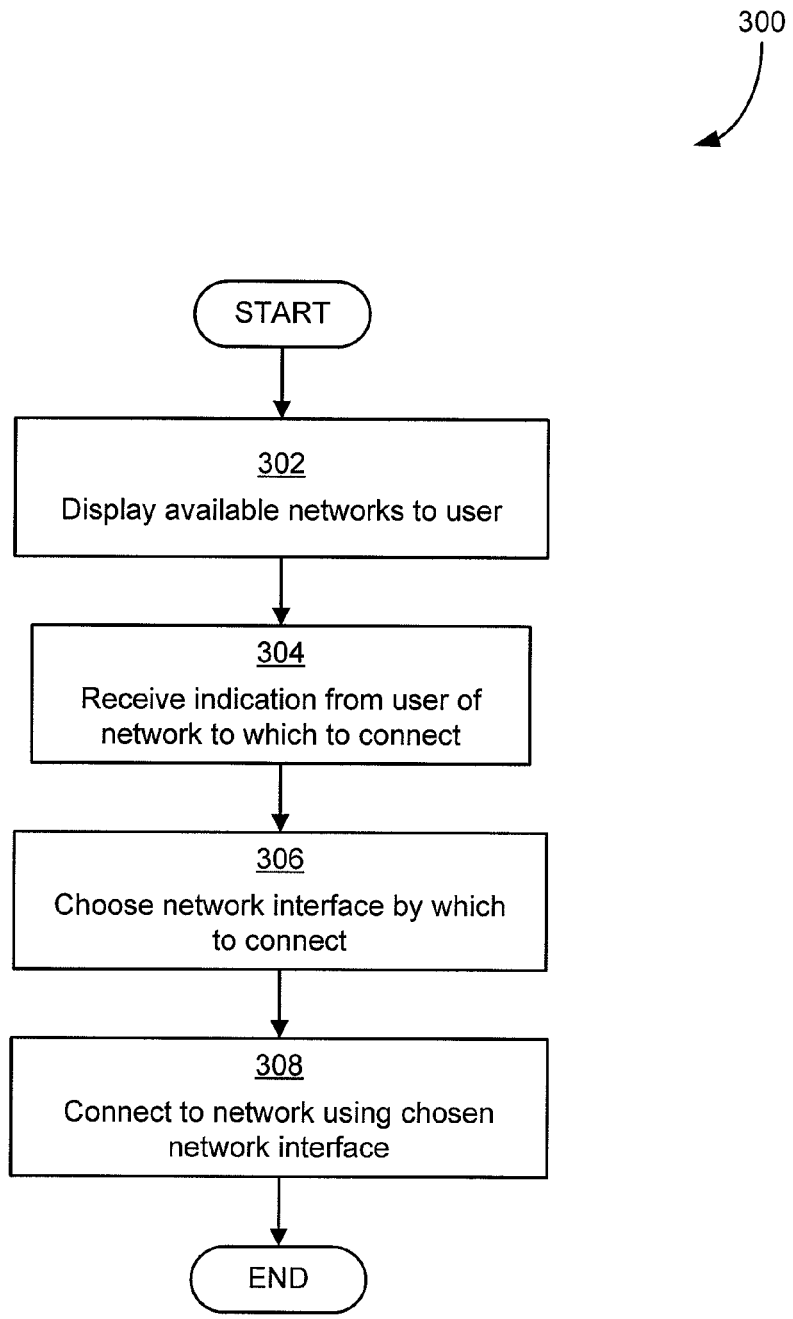
FIG. 3 is a flowchart of an exemplary process for performing networking tasks, such as establishing a connection, in accordance with one or more of the principles described herein.

FIG. 3 shows one exemplary process that may be followed for performing networking tasks in accordance with some of the principles described herein. Specifically, FIG. 3 shows an exemplary process 300 for performing a connection process. It should be appreciated that while FIG. 3 is described in connection with providing information to and receiving information from a user, other processes may be implemented which interact with any other suitable consumer of network information to perform a connection process.

The illustrative process 300 begins in block 302, wherein a connection module provides a set of available destination networks (e.g., destination networks to which a computing device may connect) to a user via a suitable user interface. The set of available destination networks may be determined in any suitable manner, such as by an identification module executing on the computing device and following the exemplary process 200 described above in connection with FIG. 2. The set of available destination networks may provide to the user the identifiers assigned in blocks 206 or 208 for the networks, and may not, in some embodiments, provide any indication of the network interface(s) via which a user may establish a connection to a destination network-though in other implementations, such indications of network interfaces may be provided.

In block 304, a user provides to the connection module an indication of a desired destination network to which the user wants to connect. In block 306, the connection module examines information stored on the desired destination network to determine a set of one or more network interfaces which provide access to the desired destination network. The connection module may then determine, from the set of network interfaces, a particular network interface by which to connect to the desired destination network. This process may be carried out in any suitable manner. For example, a particular network interface may be randomly selected from the set of network interfaces. Alternatively, a particular network interface may be selected based on default rules provided for the computing device as a whole or for the desired destination network. For example, rules—that may apply to the computing device as a whole (e.g., for all network interfaces to all destination networks) or the desired destination network—may stipulate that a wired interface may be preferred over a wireless interface when available, or vice versa, or that an IEEE 802.11g interface should be preferred over an IEEE 802.11b interface, or that a secure interface should be preferred over a non-secure interface, and so on. Any suitable rules for selecting a particular network interface may be established in any suitable manner, including by accepting input from a user (including an administrator) or by accepting a policy from a network (e.g., the user's office network), such as the policy stored in data store 112.

In block 308, a connection is established to the desired destination network using the network interface selected in block 306. A connection may be established in any suitable manner according to one or more protocols of the network interface selected, and may comprise any suitable actions for a connection. Once the connection is established in block 308, the process 300 ends.

It should be appreciated that the exemplary process 300 shown in FIG. 3 is merely illustrative of the types of processes that may be implemented for performing networking tasks in accordance with some of the principles described herein, and also merely illustrative of the types of processes that may be implemented for establishing a connection.

Additionally, in some implementations, a process may comprise more or fewer actions than shown in FIG. 3. For example, in some implementations, the process may comprise an additional act of verifying, upon connection, that the network to which a computing device is connected is the network which was identified in block 204 and selected as desired in block 304. The verification process may be done in any suitable manner, such as by comparing selected network properties to a data store of network properties or by attempting to connect to computing devices known to be present in the desired destination network. If the network to which the connection is established is the desired destination network, then the process may retrieve from the network one or more network characteristics to be stored locally for use in identifying and/or verifying the network in the future (e.g., store a Domain GUID or Forest GUID for the network, or other characteristics).

Figure 4:
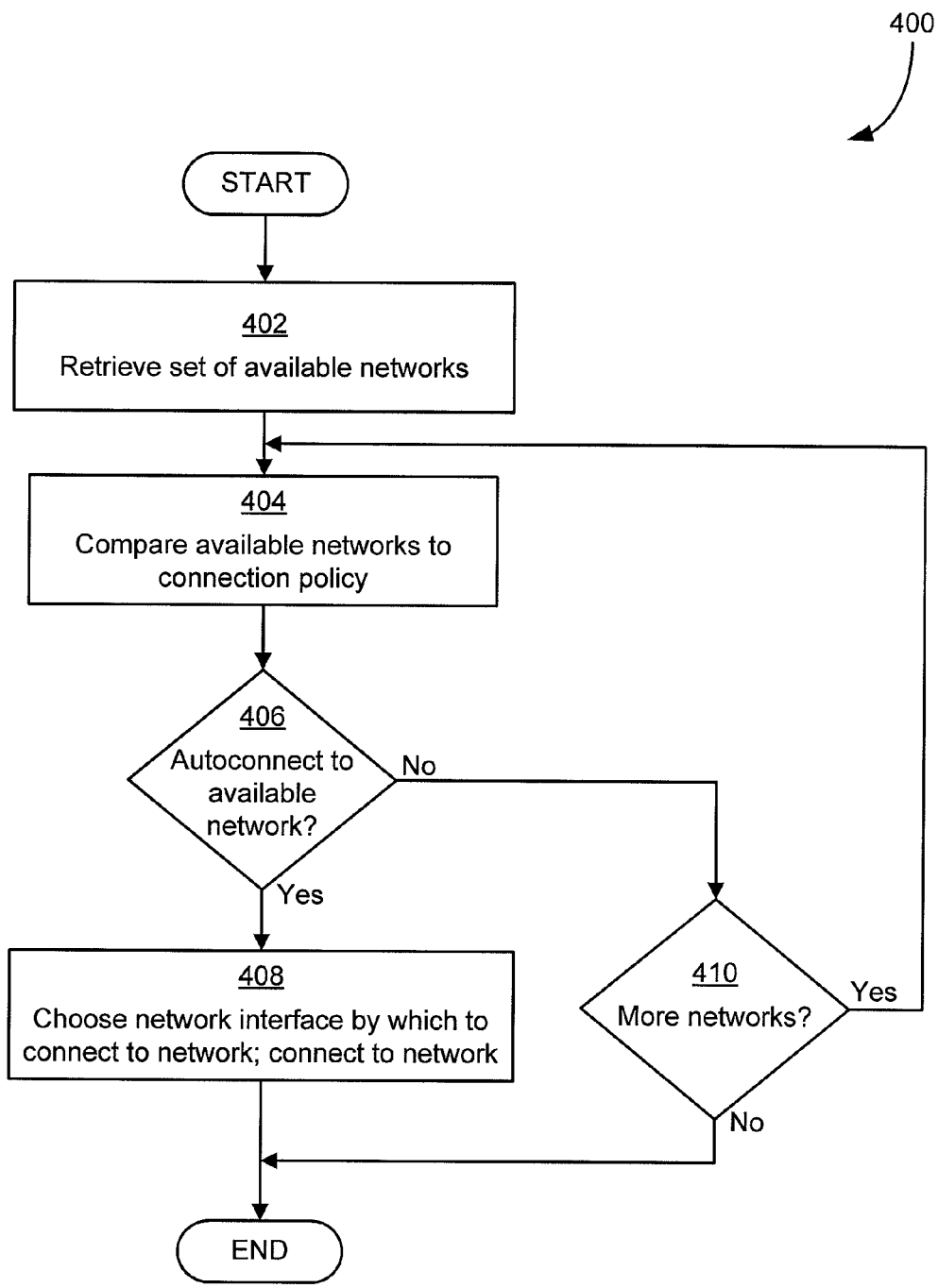
FIG. 4 is a flowchart of an exemplary process for connecting to networks using a connection policy, in accordance with some of the principles described herein.

FIG. 4 shows an additional or alternative process for establishing a connection to a network in accordance with some of the principles described herein. In the exemplary process 400, a connection is established according to a connection policy stored on the computing device specifying, for example, one or more networks to which the computing device should connect when those networks are available. Some such policies may additionally stipulate a hierarchy to be followed in the case that two or more of the indicated networks are available at one time, though others may not (and instead rely on, for example, a "first detected" or random scheme to select a network to which to connect). Process 400 may be followed at any time, including when a computing device is first seeking to establish a connection to a network or when already connected to another network and monitoring available destination networks for a "preferred" destination network indicated by the connection policy.

The exemplary process 400 begins in block 402, wherein a policy module retrieves a set of available networks. The set of available networks may be retrieved from any suitable source, such as from a data store or from an identification module, such as the one described above, activated by the policy module. This set may have been identified in any suitable manner, including by a process such as the exemplary process 200 described above in connection with FIG. 2. In block 404, the policy module retrieves from a data store (e.g., the same or a different data store as block 402) a connection policy. The connection policy may comprise any suitable information on establishing or managing connections, such as information comprising a listing of one or more "preferred" networks. A connection policy may additionally or alternatively comprise information on limits to a number of connections, a number of simultaneous/parallel connections to a particular destination network or networks, destination networks which should or should not be connected to simultaneously, and/or any other suitable information. A connection policy may additionally or alternatively include information on any suitable parameters to consider when establishing connections, such as connection cost, connection speed, and/or a preferred sequence in which a connection module should attempt to establish connections (e.g., wired interfaces before wireless interfaces).

As above, a listing of preferred networks may identify networks based on the destination infrastructure, such that the policy does not need to stipulate particular network interfaces and processes may be simplified. The listing of the preferred networks may comprise, for each network, an identifier for the network, an indicator for whether the computing device should automatically connect to network when it is available, an indicator for whether to mark the network as preferred in a user interface, and/or any other suitable information. Alternatively, a computing device may be adapted to treat all networks in the listing of preferred networks as ones to which the computing device should connect (e.g., automatically, or manually by, for example, prompting a user) when available. Once the connection policy is retrieved, the policy module compares the set of available networks retrieved in block 402 to the listing of the preferred networks. Comparing the networks may be done in any suitable manner, such as by comparing properties and characteristics of the networks (e.g., by comparing Domain GUIDs, MAC addresses of network gateways, or other suitable network identifiers).

For each network identified as available and appearing in the listing of preferred networks, the policy module determines, in block 406, whether the computing device should be connected to the network (e.g., automatically, without user intervention, or manually, by, for example, prompting a user). This may be done in any suitable manner, such as by examining an indicator in the connection policy for the network or by identifying the network in the listing. In some cases, such as where the computing device is already connected to another network, block 406 may comprise identifying whether the network should be connected to regardless of other circumstances (e.g., whether the computing device should disconnect from the first network to connect to the preferred network). For example, if a hierarchy of preferred networks is in place, block 406 may comprise determining whether the network to which the computing device is already connected is higher in the hierarchy than the identified network. If it is determined, for any reason, that the computing device should not be connected to the identified network, then policy module moves on to block 410 and determines whether more networks should be evaluated (e.g., whether more preferred networks are available to the computing device). If so, it continues to evaluate the other networks, and if not, the process ends.

However, if the policy module determines in block 406, for whatever reason, that the computing device should be connected to the identified network—and that it should be connected to the network automatically or that a user has indicated that a connection should be established—then in block 408 the policy module instructs a connection module to form a connection to the identified network. The connection module then determines, in any suitable manner—including the exemplary processes described above in connection with FIG. 3—a particular network interface over which to establish a connection to the network identified in block 406, and the process ends.

It should be appreciated that the process 400 is merely illustrative of processes that may be implemented for managing network connectivity according to a connection policy including a preferred network listing in accordance with some of the principles herein, and that embodiments of the invention are not limited to implementing such a process. In some embodiments, no technique may be implemented for managing network connectivity according to a connection policy. In the implementations that do, however, any suitable connection policy or policies may be used in accordance with the principles described herein, and any suitable technique may be used to evaluate a connection policy. It should be appreciated that the techniques used to evaluate policies may differ from one another according to the structure and contents of the policies, and, as such, in some implementations connection policy techniques may differ from the exemplary technique shown in FIG. 4.

Further, in some implementations, a process for establishing a connection in accordance with a connection policy may include an additional act of carrying out one or more pre- or post-connection actions specified by the connection policy. For example, a connection policy may describe that establishing a connection to a destination network via one network interface may require a pre-connection action of establishing a connection to another destination network. For example, as described above in connection with VPN interface 104 in FIG. 1A, establishing a connection via a VPN requires that a first connection to another network be established as a host connection over which the VPN connection may be established. A computing device may therefore establish a connection to another network in accordance with a connection policy when a connection via a particular network interface or type of network interface is desired. As another example, a connection policy for a network may stipulate that a particular process should be run following connection to a particular network; for example, a connection policy may stipulate that a web browser should load a company intranet web page when a computing device connects to the office network. As another example, a connection policy may stipulate that particular settings should be enforced while connected to another particular network; for example, when a computing device is connected to the home network, a particular default printer should be used (i.e., the printer in the home, rather than the printer in the office). Any number and type of actions may be stipulated by a connection policy for network interfaces, networks, and groups of networks, and these actions may be executed as stipulated pre- or post-connection as part of a connection policy evaluation process.

Policies, such as connection policies and security policies, may be established in any suitable manner. For example, a user (including an administrator) may define the policies locally by providing one or more inputs describing the policy, or policies may be uploaded to the computing device from another computing device or from a network to which the computing device connects (e.g., uploaded from a data store such as data store 112). Policies may be stored on a computing device in any suitable manner, such as stored independently to apply to all networks and interfaces, in association with one or more particular networks, and/or in association with one or more particular network interfaces. For example, a connection policy, such as one identifying preferred networks, may be stored independently to apply to all networks, while another connection policy, such as one identifying preferred network interfaces for a network, may be stored in association with the network (i.e., stored with an indication that it applies to the network). As another example, one security policy may be stored in association with a particular network, such as one that identifies firewall rules and/or authentication techniques to implement for a connection to the network, while another security policy may be stored in connection with particular network interfaces to the network, such as a security policy outlining particular security techniques to implement for particular interfaces. In some implementations, indications of the policies may be stored in connection with both a network and with particular network interfaces, such that if a new network interface is added (e.g., a new networking technology) the policies may be stored in association with the new network interface—and applied to connections established to the network through the new network interface—without intervention from a user, upon detection that that network interface provides access to the network.

Policies may also be stored based on characteristics of networks, and not the networks themselves. For example, policies (e.g., connection and security policies) may be stored for "new networks;" that is, default policies to be applied to networks to which the computing device has not previously connected. For example, a high security level may be implemented for all new networks, with more firewall rules and/or other security techniques implemented. These policies may be applied to all network interfaces through which a connection is established to a new network, thereby reducing the efforts needed to manage connections and establish policies that previously would have needed to be created and stored for individual network interfaces (and created and stored again and again as new network interfaces are created). As another example, policies may be applied for all "trusted" or "preferred" networks and applied to each of the networks indicated and, in turn, to each of the network interfaces providing access to the networks, such that managing policies for these networks can be made, in some implementations, as easy as adding an indication for a network to a listing of trusted or preferred networks.

Figure 5:
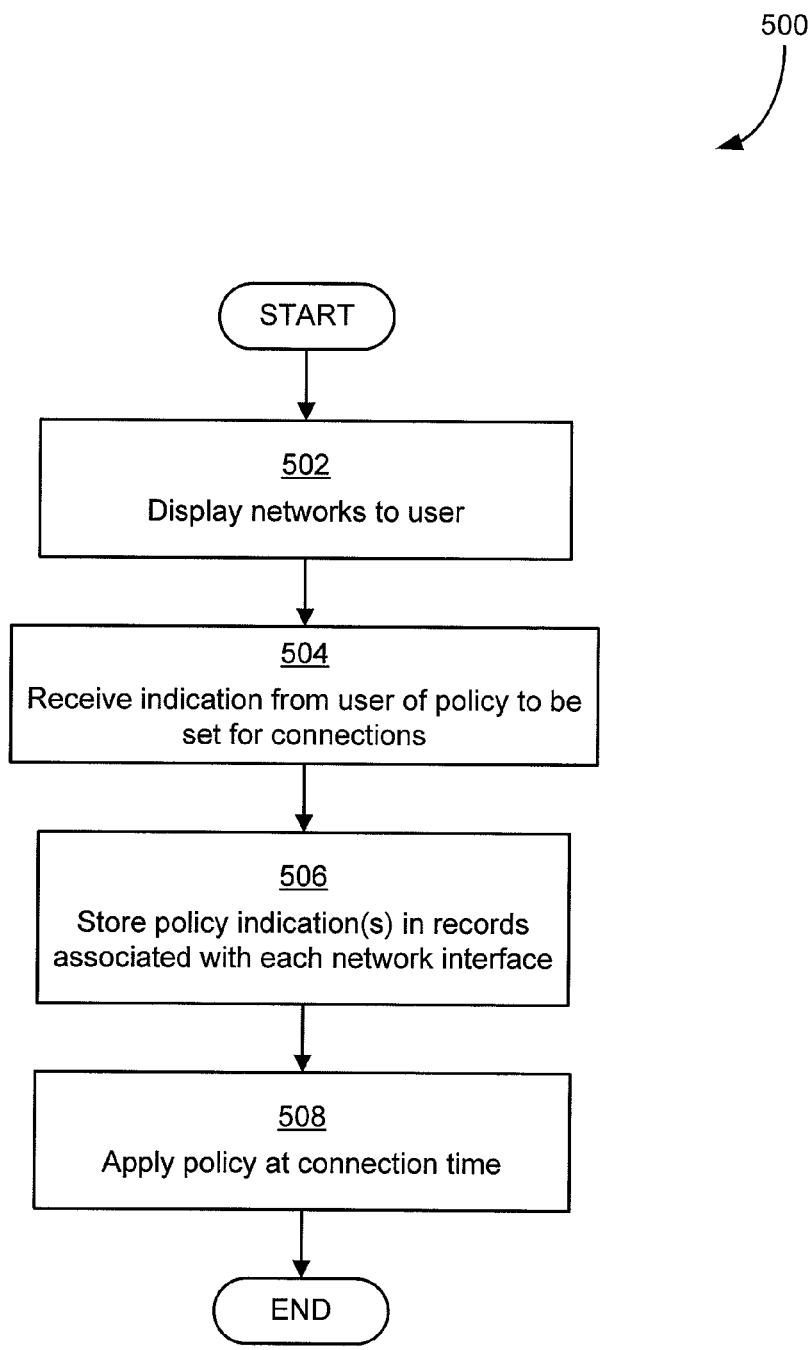
FIG. 5 is a flowchart of an exemplary process for performing networking tasks such as policy management in accordance with one or more of the principles described herein.

In accordance with some of the principles described herein, some techniques for policy management may be used to create and manage policies at a network level (i.e., in association with the network) and to store the policies at a connection level (i.e., in association with the connection). The exemplary process 500, illustrated in FIG. 5, is one such process, though it should be appreciated that others are possible.

The process 500 begins in block 502, wherein a set of networks are displayed to a user in a suitable user interface. The set of networks may be any suitable set, including a set of available networks identified by an identification module following a process such as the one described above in connection with FIG. 2, or a set of preferred networks indicated in a connection policy, a set of networks to which the user has previously connected (and may connect to again in the future), or any other suitable set. In block 504, the user provides one or more indications of a policy to be set for one or more networks. The one or more indications may comprise, for example, information on the one or more networks to which the policy should apply, one or more settings to apply as part of the policy, and/or any other suitable information. The one or more indications may indicate, for example, that a security policy should be enforced for all connections to a particular network and that the security policy includes a firewall having one or more specified rules (e.g., block all traffic on Transmission Control Protocol/Internet Protocol (TCP/IP) port 22). The indications may be accepted from the user in any suitable manner, such as via a user interface, and provided to the policy module in any suitable manner, such as through an API.

In block 506, the indications are stored in records associated with each network interface. For example, each network interface may have an associated data store storing policies that may be applied to connections to all networks established using the interface and/or connections to particular networks using the interface. For example, for an Ethernet network interface, multiple records may be maintained for each destination network to which the computing device may connect using a wired interface, and each record may stipulate policies to be applied such as connection policies (e.g., what actions to take when connecting, such as whether to retrieve a DHCP IP address) and/or security policies (e.g., what firewall rules to apply when connecting).

Once the indications are stored in the records, in block 508 the indications may be retrieved at connection time by a policy module (or by a connection module, depending on the particular implementation) and applied to the connection established through the network interface. For example, if a security policy stored in records of an Ethernet network interface includes firewall rules to be applied when connecting through a particular network, then the policy module may, at connection time, retrieve the indications of the firewall rules from the records and provide them to a firewall to be enforced. Once a connection is established and the policies enforced, the process 500 ends.

It should be appreciated that the process 500 illustrated in FIG. 5 is merely illustrative of the types of processes that may be implemented in accordance with some of the principles described herein to manage creation and storage of policies. In the embodiments that implement techniques for creating and managing policies (e.g., connection and security policies, and other suitable networking policies) any suitable process may be implemented, as the invention is not limited to implementing any particular technique for creating and managing policy or, indeed, any technique at all.

Further, it should be appreciated that while FIG. 5 describes the process 500 as accepting input from a user, in some implementations a process may be additionally or alternatively adapted to accept indications from any suitable consumer of network information. For example, a process executing on the computing device, or on another computing device, may create and manage policy through an API adapted to communicate with the policy module.

An API may be implemented to carry out any suitable one or more tasks or processes in accordance with some of the principles described herein. For example, API calls may be established which trigger the identification module to determine available destination networks and which may provide in return a listing of available networks. An API call may also be implemented which takes as input a particular network identifier and provides in response a set of network interfaces that provide access to the particular network. An API call may also be implemented that selects a network interface by which to establish a connection to an identified network and establishes a connection, and another API call may be implemented which takes as input an identifier for a particular network interface (and, in some implementations, a particular network) and establishes a connection through the network interface. As mentioned above, API calls may be implemented which create and manage policies for all networks, for particular networks, and/or for particular network interfaces. For example, an API call may be established to manage a connection policy by, for example, marking a particular network as a preferred network. It should be appreciated that, in the embodiments that implement an API, any suitable API call implementing any suitable networking task may be implemented, as the invention is not limited to implementing any particular one or more API calls.

Figure 6:
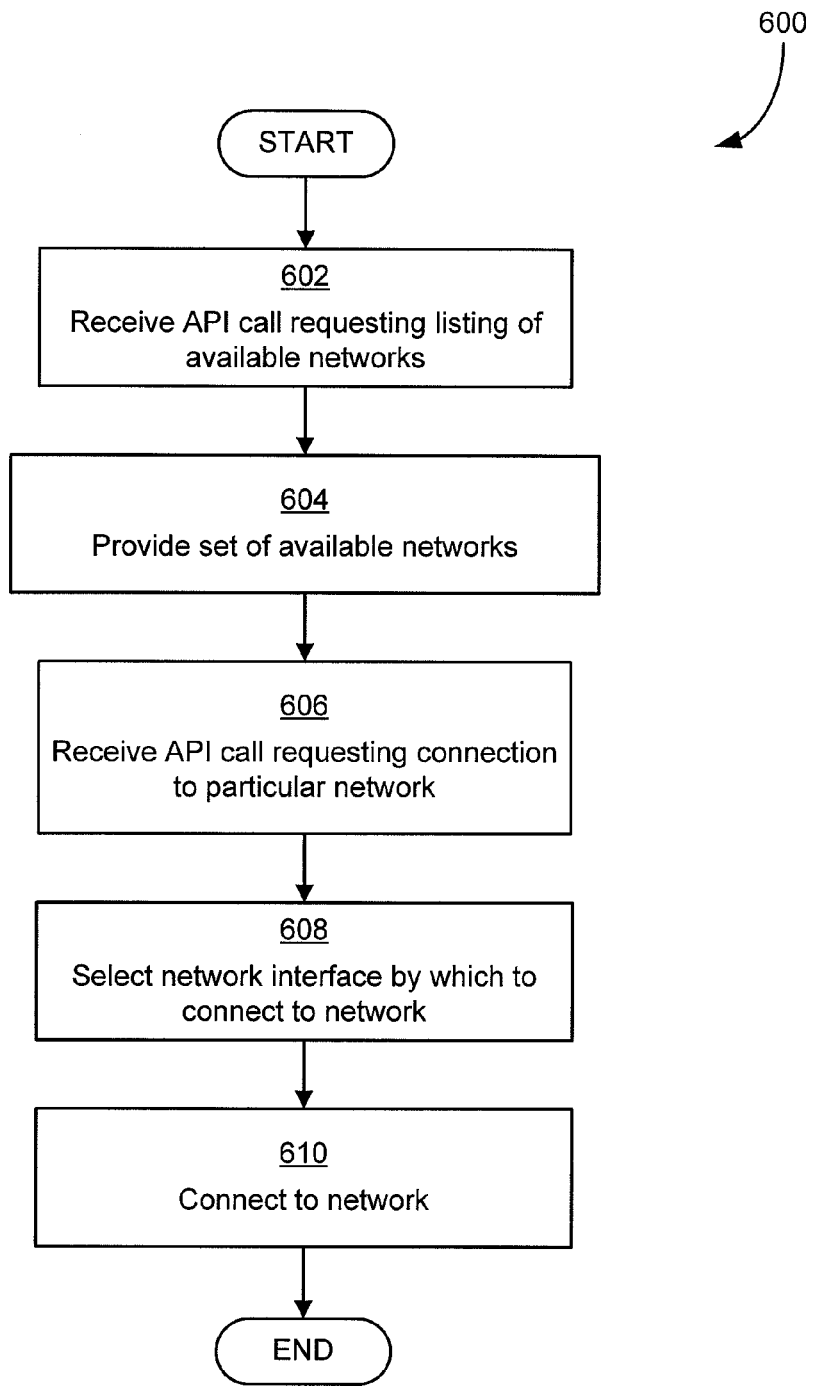
FIG. 6 is a flowchart of an exemplary process by which an outside process may interact with network management processes using an Application Programming Interface (API), in accordance with some of the principles described herein.

While conventional networking techniques required individual API calls for each network interface or type of network interface (e.g., an API for wired interfaces and an API for wireless interfaces), in accordance with some of the techniques described herein, in some implementations, but not all, a single API may be offered for all networks and interface types. Because, in accordance with the principles described herein, networks may be managed by consumers of network information (e.g., users and processes) according to the destination networks and not according to individual network interfaces, an API may be implemented that interacts with users only at the network level and perform all lower-level (e.g., network interface level) processing internally. As a result, only a single API library (i.e., a single group of one or more API calls) may be implemented, because from the perspective of the consumer of network information all processing is the same. For example, as shown in FIG. 6, using the principles described above in connection with FIG. 3, a consumer of network information need only specify via the API a destination network to which it desires access, and a connection module may, without user intervention, select a particular network interface by which to establish the connection. Accordingly, programming of networking program applications (i.e., applications which manage and/or use network interfaces) may be simplified and streamlined, as the applications need only use a single API, rather than including support for using multiple different APIs depending on the types of the available network interfaces.

FIG. 6 shows one exemplary process 600 that may be implemented in accordance with some of the principles described herein for performing networking tasks using an API. In the example of FIG. 6, the networking task performed is connecting to a network, though it should be appreciated that, in the embodiments which implement an API, any suitable networking task may be performed using the API, as embodiments of the invention are not limited to implementing an API offering any particular functionality.

The illustrative process 600 begins in block 602, wherein an API manager (e.g., an operating system or other suitable component) receives an API call from a consumer of network information requesting a listing of available networks. The consumer of network information may be another process executing on the computing device, or may be a user interface of the computing device. The API manager, in response to the received call, may retrieve a set of available networks from a data store, activate an identification module to identify available networks, or take any other suitable action. In block 604, the set of available networks (either retrieved from the data store or provided by the identification module) is provided to the consumer of network information.

In block 606, the API manager receives another API call specifying a desired destination network and requesting that a connection be established to the desired destination network. In block 608, the API manager may retrieve from a data store a set of network interfaces providing access to the desired destination network and, in any suitable manner such as according to the techniques described above, select a particular network interface by which to establish a connection. In block 610, the API manager may then trigger a connection module to connect to the desired destination network using the selected network interface. Alternatively, the API manager may, in block 608, activate the connection module to select a particular network interface, as described above in connection with FIG. 3, and then, in block 610, request that the connection manager establish a connection. Once the connection is established, the process 600 ends.

It should be appreciated that the process 600 is merely illustrative of the types of processes that may be implemented to perform networking tasks in response to API calls, and that other processes, including other processes that for establishing connections to networks in response to API calls, may be implemented in accordance with the principles described herein. It should also be appreciated that, in some implementations, no API may be implemented and, accordingly, no process for performing networking tasks in response to API calls may be implemented. However, in the implementations which do offer one or more API calls, any suitable API call and any suitable technique for processing an API call may be implemented in accordance with the principles described herein.

As discussed above, techniques operating in accordance with the principles described herein offer many advantages for performing networking tasks. For example, creation and management of networking policies may be made easier by allowing for users (including administrators) to specify policies in terms of networks, rather than in terms of individual interfaces, as discussed above. In this way, the time and energy users (including administrators) must spend creating and managing networking policies is reduced, as the networking policies for multiple network interfaces may be created in terms of a single destination network. Further, creating policies for groups of networks, such as trusted networks and unknown networks, may be made easier, as policies may be created to apply to such groups of networks that will then be applied to network interfaces providing access to networks in these groups. Further, because connections may be established and managed in terms of destination networks, and not in terms of individual network interfaces, connection policies may be made simpler, such that instead of specifying many particular network interfaces that should be used when available, a connection policy may specify that a particular network should be connected to when available using any suitable network interface. Additionally, as discussed above, APIs may be made simpler and use of APIs (in, for example, program applications) may be made simpler and more efficient, as only a single suit of API functions need to be supported. Accordingly, managing networks and performing networking tasks provides many advantages for simplifying network policies.

Figure 7A:
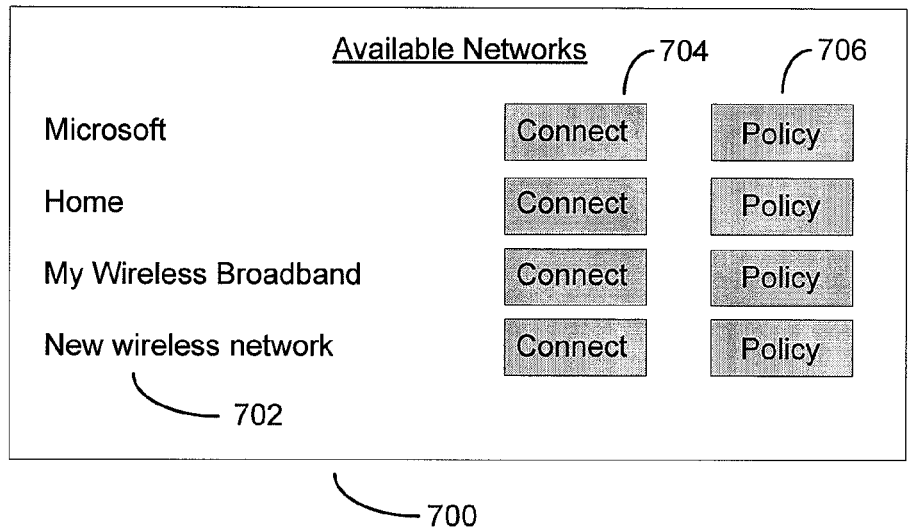
FIG. 7A is a diagram of an exemplary user interface which may be implemented by one exemplary technique operating according to some of the principles described herein.

Further, as discussed above, user interfaces may be made simpler to make it easier for users to understand and interact with network interfaces. FIG. 7A shows a rough diagram of one exemplary user interface that may be used in some implementations for performing networking tasks in accordance with the principles described herein, and FIG. 7B shows, for comparison, a rough diagram of a conventional user interface that may have been implemented for performing networking tasks.

User interface 700 of FIG. 7A comprises a listing 702 of available networks that may have been identified as available in any suitable manner, including by an identification module operating according to the techniques described above in connection with FIG. 2. It should be appreciated that listing 702 shows available destination networks, and does not show particular network interfaces because, as discussed above, some users find the number and types of network interfaces confusing and may be deterred from taking full advantage of all options. Some alternative user interfaces, however, may show some or all of the network interfaces that provide access to a listed network, or may permit users to view the network interfaces upon request. User interface 700 further comprises a button 704 that permits the user to signal that a connection should be established to a listed network by any suitable network interface, without the user needing to specify particular connection options or select particular network interfaces, though in alternative user interfaces the user may be permitted or required to select options. Selecting the button 704 for a network may trigger a connection module to select a particular network interface over which to establish a connection and then establish a connection, as discussed above in connection with FIG. 3, or may activate any other suitable module carrying out any suitable task. A button 706 is also provided for activating a policy module to create and/or manage a security policy for the network as a whole, rather than for individual interfaces to the network, and a button 708 is provided to allow a user to operate a policy module to create and/or manage a connection policy. It should be appreciated that user interface 700 is merely exemplary of the types of users interfaces that may be implemented in accordance with the principles described herein, and other user interfaces with more or fewer components may be implemented.

Figure 7B:
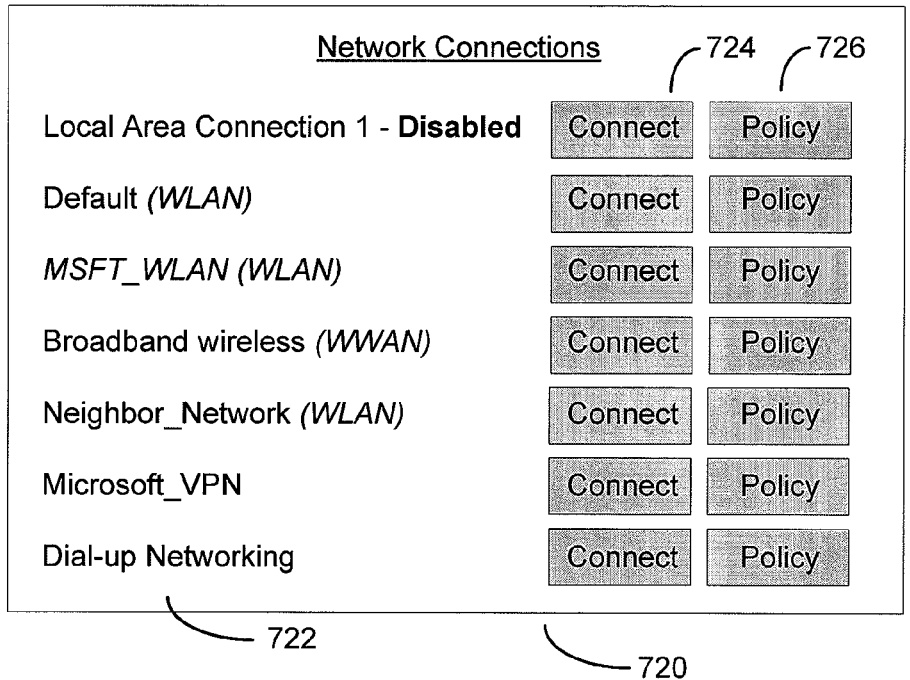
FIG. 7B is a diagram of a conventional user interface which may have been used to convey the information conveyed by the user interface of FIG. 7A.

The user interface 700 of FIG. 7A may be distinguished from the user interface 702 of FIG. 7B. User interface 700 has far fewer options and listings for a user to manage than user interface 702, and user interface 700 presents these options with descriptions that are easier to understand. For example, user interface 700 presents a listing for "Microsoft," that may indicate that a connection is available to the user's office network, where user interface 720 presents a wider range of options for the same network that include "Local Area Connection 1," which may offer a wired interface at some points, but is listed as disabled; "Microsoft_VPN," offering a VPN interface to the office network; and "Dial-up Networking," that may offer a RAS interface to the office network via a phone line. Additionally, the user interface 700 provides simplified entries for "Home," "My Wireless Broadband," and "New wireless network," whereas user interface 720 provides corresponding entries for "Default (WLAN)," "Broadband wireless (WWAN)," and "Neighbor_Network (WLAN)" that are less descriptive and require more information from a user.

Techniques operating according to some or all of the principles described herein may be implemented in any suitable manner. For example, in some embodiments, the techniques may be implemented as computer-executable instructions encoded on one or more computer-readable storage media such as magnetic media (e.g., a hard disk drive), a Compact Disk (CD), a Digital Versatile Disk (DVD), a persistent or non-persistent solid-state memory (e.g., Flash memory, Magnetic RAM, etc.), or any other suitable storage media. The computer storage media may be implemented as computer-readable storage media 806 of FIG. 8 (i.e., as a portion of a computing device 800) or as a separate computer storage medium.

In some such embodiments, the computer-executable instructions implementing the techniques operating in accordance with the principles described herein may be implemented as one or more stand-alone modules (e.g., the import module and the estimation module described above). As described above, a "module" is a structural component of a system which performs a specific operational role, however instantiated, which may be a portion of or an entire software element (e.g., a function or a discrete process). Generally, program modules include routines, programs, objects, components, data structures, etc. that perform particular tasks or implement particular abstract data types. Typically the functionality of the program modules may be combined or distributed as desired in various embodiments. These modules may, in some implementations, be adapted to interact with other, unrelated modules and/or processes, such as modules implementing a networking program application or implementing an operating system for a computing device, or, in other implementations, the modules may be adapted to interact with other modules which, together with the modules, form an overall system such as an operating system such as the Microsoft Windows operating system, available from the Microsoft Corporation of Redmond, Wash. (i.e., the modules may be implemented as a portion of or outside of an operating system). It should also be appreciated that, in some implementations, some modules may be implemented separately from others, or some modules may not be implemented, such that, in one exemplary implementation, an identification module and a connection module may be implemented, but a policy module may not be implemented or may be implemented as a separate software component.

In some, but not all implementations, the techniques may be embodied as computer-executable instructions that may be executed on any suitable computing device(s) operating in any suitable computer system, including the exemplary computer system of FIGS. 1A and 1B. For example, techniques operating according to some or all of the principles discussed herein may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 8:
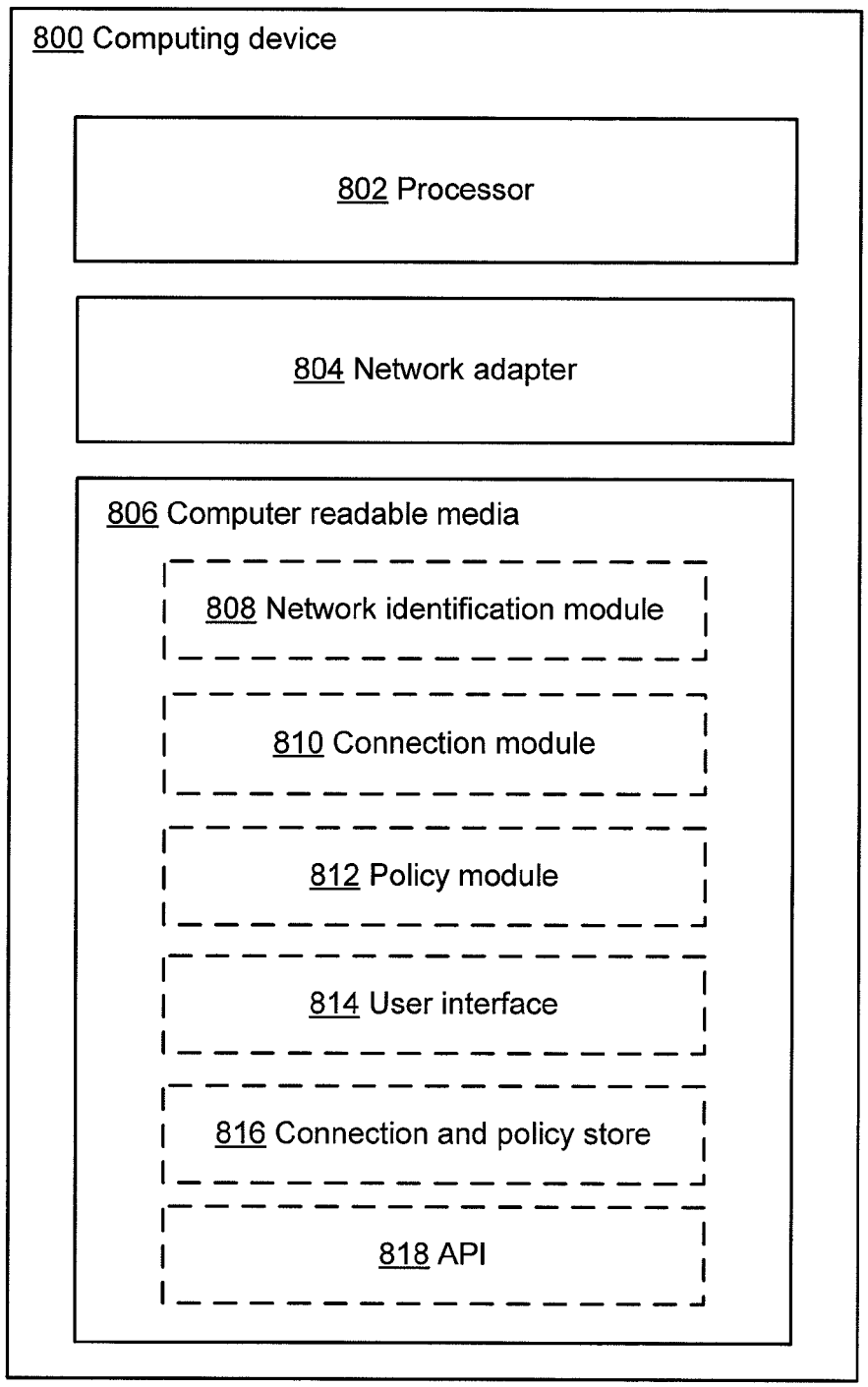
FIG. 8 is an exemplary computing device with which techniques operating in accordance with one or more of the techniques described herein may operate.

FIG. 8 illustrates one exemplary implementation of a computing device in the form of a computing device 800 that may be used in a system implementing the techniques described herein, although others are possible. Further, it should be appreciated that FIG. 8 is intended neither to be a depiction of necessary components for a computing device to operate in accordance with the principles described herein, nor a comprehensive depiction.

Computing device 800 may comprise a processor 802, a network adapter 804, and computer-readable storage media 806. Computing device 800 may be, for example, a desktop or laptop personal computer, a workstation, a server, a mainframe, or any other suitable computing device. Network adapter 804 may be any suitable hardware and/or software to enable the computing device 800 to communicate with any other suitable computing device over any suitable computing network. The computing network may be any suitable wired and/or wireless communication medium or media for exchanging data between two or more computers, including the Internet. In some implementations, network adapter 804 may be implemented as two or more separate network adapters, offering connectivity via two or more types of network interfaces (e.g., a wired network adapter such as an Ethernet adapter and a wireless network adapter such as an IEEE 802.11g adapter). Computer-readable media 806 may be adapted to store data to be processed and/or instructions to be executed by processor 802. Processor 802 enables processing of data and execution of instructions. The data and instructions may be stored on the computer-readable storage media 806 and may, for example, enable communication between components of the computing device 800.

The data and instructions stored on computer-readable storage media 806 may comprise computer-executable instructions implementing techniques which operate according to the principles described herein. In the example of FIG. 8, computer-readable media 806 stores computer-executable instructions implementing various modules and storing various information as described above. Computer-readable media 806 stores a network identification module 808 that may implement a network identification process, such as the one described above in connection with FIG. 2, and a connection module 810 that may implement a connection process such as the one described above in connection with FIG. 3. Computer-readable media 806 further comprises a policy module 812 for creating and/or managing networking policies (e.g., connection and security policies). A user interface 814 may also be stored on computer-readable media 806 for display on a display device of a computing device 800 or another computing device. The user interface 814 may be implemented according to the example of user interface 700 of FIG. 7A, or may be any other suitable user interface. Computer-readable media 806 may further comprise a connection and policy data store 816, for storing information on networks which has been retrieved from networks by the computing device 800 prior to connection or from a previous or current connection to a network and for storing information on policies (e.g., connection and/or security policies) that may be applied to connections of the computing device 800. An API 818 may also be stored on computer-readable media 806 to allow consumers of network information (e.g., the user interface 814, or a process executing on the computing device 800 or on another computing device) to provide information to and request information from one or more of the modules such as the identification module 808, connection module 810, and/or policy module 812, or store information in or request information from the connection and policy store 816.

Figure 9:
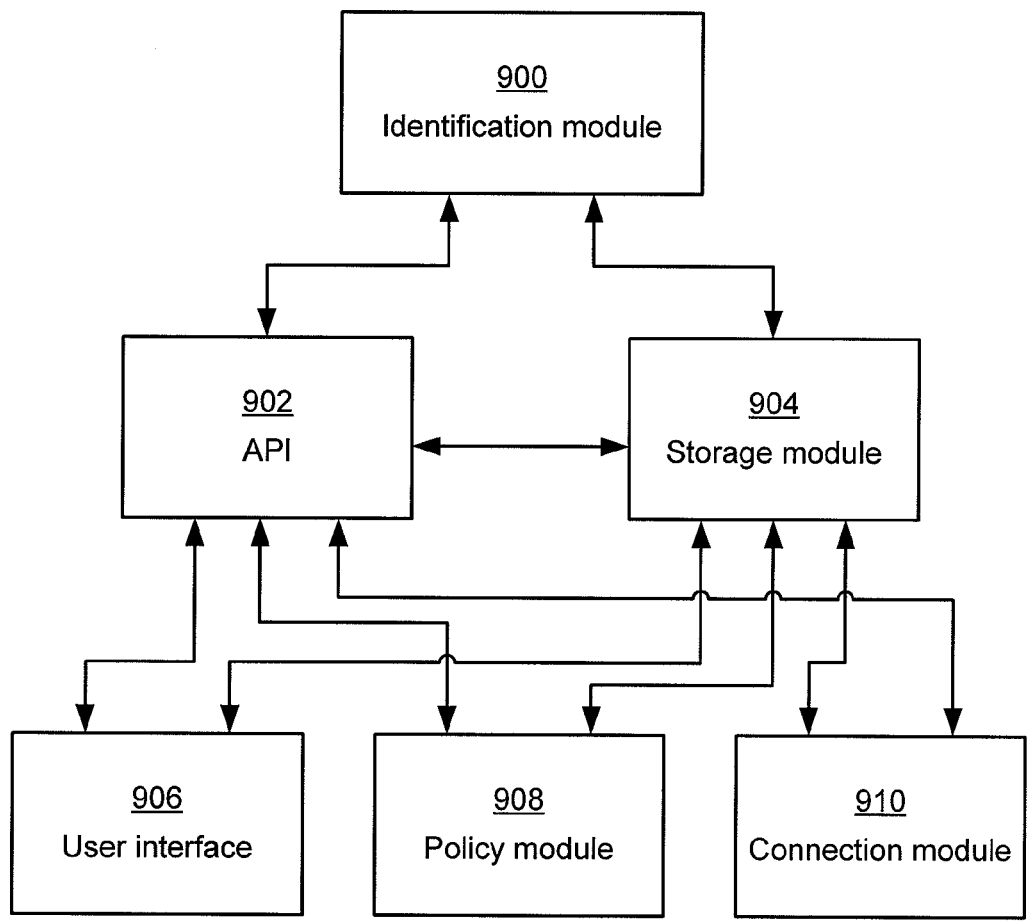
FIG. 9 is a diagram of an exemplary manner of interoperability of modules that may be implemented in accordance with one or more of the techniques operating according to principles described herein.

The modules implementing techniques operating according to the principles described herein may interact in any suitable manner. FIG. 9 shows one exemplary arrangement of modules that may be implemented in accordance with some of the principles described herein.

In the example of FIG. 9, an identification module 900 may be adapted to store information, such as information on identified destination networks, in a data store through interacting with a storage module 904. A user interface 906 may also interact with the storage module 904, for example, to retrieve information on identified destination networks and present it to a user in the user interface. A policy module may be adapted to interact with the storage module 904 to retrieve information on policies that have been created and stored in one or more data stores managed by the storage module 904, and may be further adapted to send information on policies to the storage module 904 to be stored in the data store. A connection module 910 may be adapted to communicate with the storage module 904, for example, to retrieve information on a connection policy and/or to retrieve information on identified networks and network interfaces which provide access to those identified networks. An API module 902 may also be implemented to interact with each of the other modules to provide communication abilities between the modules in some implementations or to provide access to the modules from outside consumers of network information (e.g., users (including administrators) and/or processes such as networking program applications).

It should be appreciated that the exemplary arrangement of modules shown in FIG. 9 is merely illustrative of the types of modules that may be implemented in accordance with some of the techniques described herein, and that other arrangements are possible. For example, all of the modules shown in FIG. 9 may be implemented as a single module, or the functionality of one or more of the modules shown may be implemented as a part of the functionality of one or more of the other modules shown. Further, the interactions shown between the modules are merely illustrative of the types of interactions that may be implemented in accordance with one or more of the principles described herein, and other implementations may offer more or fewer interactions between modules.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a computing device, the method comprising:
   (A) for each of a plurality of network interfaces, the plurality of network interfaces comprising at least two types of network interface, identifying, using at least one processor, a destination network to which a network interface provides access, at least two of the plurality of network interfaces providing access to a same destination network;
   (B) for each identified destination network, aggregating one or more common network interfaces that provide access to the identified destination network to determine a set of available destination networks; and
   (C) performing at least one network management task based on a common destination network of the set of available destination networks.

2. The method of claim 1, wherein the at least one network management task comprises connecting to the common destination network according to an input from a consumer of network information.

3. The method of claim 2, wherein connecting to the common destination network comprises selecting one of the one or more common network interfaces providing access to the common destination network by which to connect to the common destination network without input from the consumer of network information.

4. The method of claim 1, wherein the at least one network management task comprises setting a connection policy for the computing device.

5. The method of claim 1, wherein the at least one network management task comprises setting a policy for communication over the common destination network.

6. The method of claim 1, wherein aggregating the common network interfaces comprises assigning a network identifier to a group of common network interfaces.

7. The method of claim 1, wherein aggregating common network interfaces comprises
   (D) displaying to a user the set of available destination networks, at least one of the available destination networks being available via two or more of the network interfaces and displayed only once in the set of available destination networks.

8. At least one tangible computer storage encoded with computer-executable instructions that, when executed, implement a method of operating a computing device, the method comprising:
   gathering information on destination networks to which a plurality of network interfaces provide access, the plurality of network interfaces comprising at least two types of network interface;
   identifying which of the plurality of network interfaces provide access to a same destination network to determine a first set of one or more available destination networks;
   providing to a consumer of network information the first set of one or more available destination networks;
   accepting input from the consumer of network information an indication of a desired destination network to which to connect;
   selecting, from a second set of one or more network interfaces providing access to the desired destination network and without input from the consumer of network information, a particular network interface by which to connect; and
   connecting to the desired destination network via the particular network interface.

9. The at least one tangible computer storage of claim 8, wherein the consumer of network information is a user interface providing information to and accepting instructions from a user.

10. The at least one tangible computer storage of claim 8, wherein the consumer of network information is a process executing on the computing device.

11. The at least one tangible computer storage of claim 8, wherein gathering information on destination networks comprises comparing properties of a network interface to information stored in a data store of previously-retrieved properties of network interfaces associated with network identifiers.

12. A method of managing one or more network interfaces of a computing device providing access to destination networks for the computing device, the method comprising:
   identifying at least one destination network to which the computing device is able to connect via the one or more network interfaces;
   displaying to a user a user interface identifying the at least one destination network;
   detecting a selection by the user of a first destination network of the at least one destination network;
   accepting, via the user interface, one or more inputs from the user regarding at least one policy to be applied when the first destination network is available via the one or more network interfaces of the computing device;
   storing, in a data store, indications of the one or more inputs, the indications being stored so as to be associated with the first destination network; and
   regulating network connectivity according to the at least one policy when the first destination network is available.

13. The method of claim 12, wherein the data store is a data store associated with a network interface providing access to the first destination network.

14. The method of claim 12, wherein regulating network connectivity according to the at least one policy when the first destination network is available comprises:
   determining that the computing device is connected to the destination network; and
   regulating network connectivity according to the at least one policy when the computing device is connected to the destination network.

15. The method of claim 12, wherein the one or more inputs specify a connection policy.

16. The method of claim 15, wherein the connection policy identifies that the computing device should connect to the first destination network when the first destination network is available.

17. The method of claim 16, wherein the connection policy identifies at least one preferred network interface to be used to connect to the first destination network when the first destination network is available.

18. The method of claim 12, wherein the one or more inputs specify a policy to be applied when the computing device is connected to the first destination network.

19. The method of claim 18, further comprising:
identifying at least two network interfaces which provide access to the first destination network; and
storing the at least one policy for the first destination network in records associated with each of the at least two network interfaces providing access to the first destination network.

20. The method of claim 12, further comprising:
identifying new network hardware, new network software, or new network hardware and new network software installed on the computing device;
identifying a second destination network to which the new network hardware and/or software provides access; and
regulating network connectivity when the second destination network is available according to the at least one policy received prior to installation of the new network hardware and/or software.

\* \* \* \* \*